July 10, 1934.  O. J. McCULLOUGH ET AL  1,965,848

SPEAR

Filed Dec. 28, 1931

Inventors
Ira J. McCullough and
Otis J. McCullough
By
His Attorney

Patented July 10, 1934

1,965,848

UNITED STATES PATENT OFFICE 1,965,848

SPEAR

Otis J. McCullough and Ira J. McCullough, Huntington Park, Calif.; said Otis J. McCullough assignor to said Ira J. McCullough Application December 28, 1931, Serial No. 583,432

15 Claims. (Cl. 294—96)

This invention relates to a fishing tool useful for removing caught or lost objects from a well and relates more particularly to a spear useful for removing tubular objects from a well. It is a general object of the present invention to provide a simple, dependable and effective spear for recovering pipe and other tubular objects from a well.

Another object of the invention is to provide a fishing tool in the form of a spear that is operable to obtain a firm, positive hold or engagement with the interior of a tubular fish or lost object in a well.

Another object of the invention is to provide a spear that is simple and easy to operate and that may be released or disengaged from the fish when desired.

It is another object of the invention to provide a fishing tool of the character mentioned that embodies a novel and improved control for the gripping means.

Another object of the invention is to provide a spear designed to carry slips or gripping means that may be made as long as desired to prevent splitting of the pipe or tubular object engaged by the spear.

Another object of the invention is to provide a spear having maximum circumferential engagement between the slips and the fish and between the slips and the body, and in which the body has a large cross sectional area so that the body of the spear is not subject to failure or breakage.

A further object of the invention is to provide a spear for recovering tubular objects from a well that embodies a minimum number of strong and sturdy parts.

Figure 1:
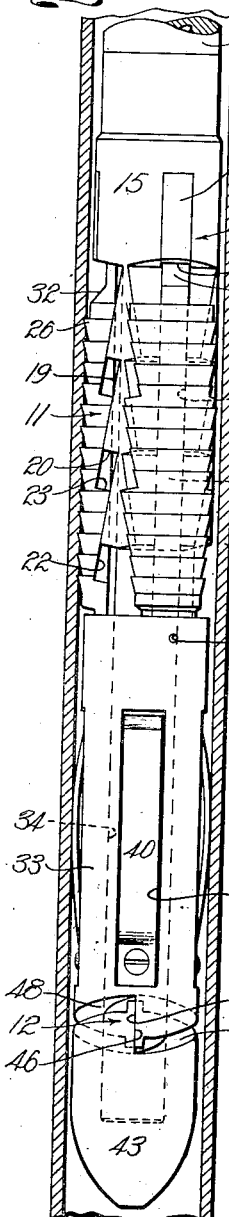
Figure 2:
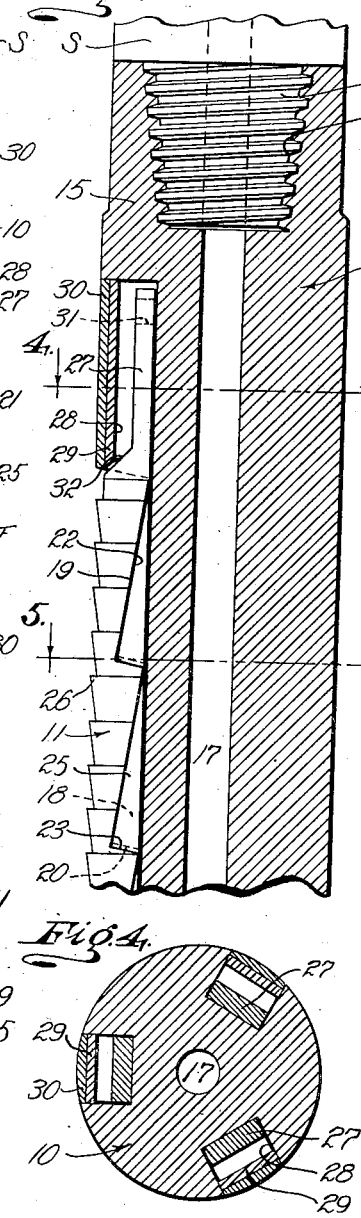
Figure 3:
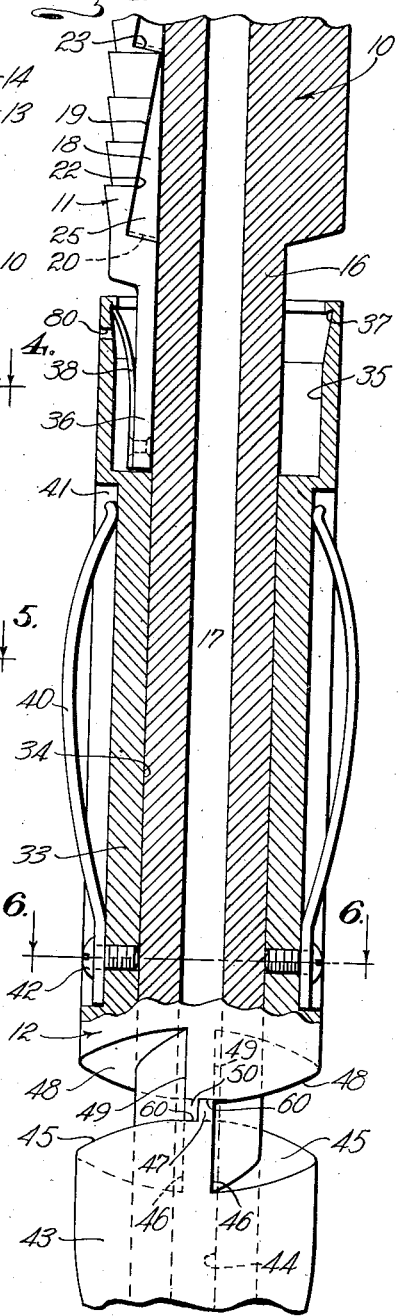
Figure 6:
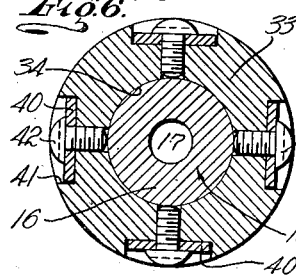
Figure 5:
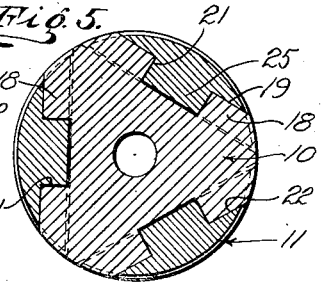

Other objects and features of the invention will be best and more fully understood from the following detailed description of a typical form and application of the invention, throughout which description reference is had to the accompanying drawing, in which:

Fig. 1 is a side elevation of the tool provided by our invention showing it in the operated position within a tubular fish or pipe. Fig. 2 is an enlarged central vertical detailed sectional view of the upper portion of the tool showing a slip in elevation in the unactuated position. Fig. 3 is an enlarged central longitudinal detailed sectional view of the lower portion of the tool, illustrating the parts in the unactuated positions, and showing the slip and the active portion of the control means in elevation. Figs. 4 and 5 are transverse detailed sectional views taken as indicated by lines 4—4 and 5—5 on Fig. 2, and Fig. 6 as a transverse detailed sectional view taken as indicated by line 6—6 on Fig. 3.

The spear provided by our present invention includes, generally, a body 10 adapted to be attached to the operating string S and adapted to be passed into the fish or object to be removed from the well, a plurality of gripping members or slips 11 operable through cooperation with the body 10 to grip the interior of the fish F, and means 12 for governing or controlling the operation of the slips 11.

The body 10 is adapted to be attached to the lower end of an operating string of drill pipe, or the like, and is adapted to be passed into the tubular object or fish to be removed from the well. The body 10 may be an elongated integral member as illustrated in the drawing. In accordance with the invention, suitable means is provided at the upper end of the body 10 for connecting the body with the operating string S. In the particular case illustrated in the drawing, a screw-threaded socket 13 is provided in the upper end of the body to cooperate with or receive the pin 14 of a tool joint section, or the like, on the lower end of the operating string. A cylindrical portion 15 is provided at the upper end of the body 10, while a stem portion 16 of reduced diameter is provided at the lower end of the body. The stem portion 16 is of round cross sectional configuration and is preferably of uniform diameter throughout its length. A central longitudinal fluid passage 17 extends through the body 10 from one end to the other.

Wedge parts 18 are provided on the body 10 to actuate or cause outward movement of the slips 11 as will be hereinafter described. The wedge parts 18 are provided on the exterior of the body 10 between the cylindrical upper portion 15 and the reduced stem portion 16. In accordance with the preferred form of the invention, there is a longitudinal set or series of wedge parts 18 for cooperating with each slip 11. In the particular construction disclosed in the drawing there are three gripping members or slips 11 and three like series of wedge parts 18. The sets or series of wedge parts 18 extend longitudinally of the body 10 and are symmetrically or equally spaced around the body. The outer sides of the wedge parts 18 are flat so that the central portion of the body 10 is of substantially triangular cross section as illustrated in Fig. 5 of the drawing. Each wedge part 18 presents a flat downwardly and outwardly inclined face 19. The lower end of each wedge part 18 terminates in a downwardly facing shoulder 20. A central longitudinal groove 21 is provided in each wedge part 18. The several grooves 21 are in vertical or longitudinal alignment, and in fact, constitute a single elongated groove or keyway.

The gripping members or slips 11 are operable outwardly or horizontally through cooperation with the wedge parts 18. A slip 11 is arranged against the several inclined faces 19 of each of the series of wedge parts. The inner sides of the slips 11 are shaped to have effective sliding or operative engagement with the wedge parts 18. A plurality of stepped inclined faces 22 is provided on the inner side of each slip 11 to slidably engage the inclined faces 19 of a series of wedge parts. The inclined faces 22 are joined by upwardly facing shoulders 23 that are adapted to cooperate with the shoulders 20 to limit relative longitudinal movement between the slips and body 10 in one direction. A series of aligned ribs or keys 25 is provided on the inner side of each slip 11 to slidably fit the grooves 21. The keys 25 form reinforcements for the slips 11 at the points where the slips have the least cross sectional area. The grooves 21 and keys 25 cooperate to guide the slips 11 vertically with respect to the body 10 and prevent lateral displacement on the slips from the wedge parts 18. The outer sides or exteriors of the slips 11 are shaped to effectively fit against or engage the interior of the tubular fish F. In the preferred construction, the outer sides of the slips 11 are serrated or provided with upwardly facing teeth 26 for gripping or biting into the inner wall of the fish F.

The slips 11 are mounted on the tool so that they may shift or move horizontally a limited extent relative to the body 10. An extension or tongue 27 is provided on the upper end of each slip 11 and extends into a recess or notch 28 in the upper portion 15 of the body. The outer sides of the notches 28 are closed by inset plates 29 retained in position by welding 30. The tongues 27 are proportioned to have lateral or horizontal movement in the recesses 28 and openings 31 are provided adjacent the outer ends of the tongues to prevent undesirable pressure developing on the sides of the tongue when the slips 18 are operated inwardly or outwardly. The tongues 27 and the notches 28 are sufficiently long to permit considerable relative longitudinal movement between the body and slips without causing displacement of the tongues from the recesses. Downwardly and outwardly inclined faces 32 are provided on the slips 11 at the bases of the tongues 27. The faces 32 are adapted to engage the lower edges of the plates 29 as will be subsequently described. The lower ends of the several slips 11 are connected with the control means 12.

The control means 12 governs or controls the actuation and retraction of the slips or gripping members 11. In accordance with the invention, the means 12 includes a tail piece 33 arranged on the stem portion 16 at the lower ends of the slips 11. The tail piece 33 has a central longitudinal opening 34 slidably passing the stem 16. The tail piece 33 is cylindrical in its general configuration and is proportioned to readily pass into the fish F. An annular groove or recess 35 is provided in the upper end of the tail piece 33. The recess 35 receives tongues 36 on the lower ends of the slips 11 and is proportioned to allow horizontal movement of the tongues 36. An annular flange at the upper end of the recess 35 presents a downwardly facing shoulder 37. A leaf spring 38 is attached to the outer side of each lower tongue 36. The leaf springs 38 project upwardly and are bowed outwardly to engage under the shoulder 37. The springs 38 operate to connect the slips 11 with the tail piece 33.

In accordance with the invention, the springs 38 bear out against the walls of the recess 35 to yieldingly hold the slips 11 in proper cooperative engagement with the wedge parts 18. The upper end of the recess 35 and the shoulder 37 may be cut as illustrated in Fig. 3 of the drawing to insure more positive engagement of the shoulder 38 with the walls of the recess. Relief ports 80 may be provided in the tail piece to communicate with the recesses. With the construction just described, the slips 11 are connected with the tail piece 33 for longitudinal movement relative to the body 10 and have limited lateral movement relative to the tail piece 33. Further, relative turning or rotation may occur between the body 10 and the tail piece 33 without causing displacement of the slips 11, as the recess 35 is annular and allows for turning movement between the slips 11 and tail piece 33.

The tail piece 33 is provided with means for yieldingly resisting movement relative to the fish F. A plurality of outwardly bowed leaf springs 40 is provided on the tail piece 33 to bear outwardly against the interior of the tubular fish F. The springs 40 may be mounted in longitudinal grooves 41 in the exterior of the tail piece 33 and may be attached to the tail piece by suitable screws 42. The springs 40 operate to resist longitudinal and rotative movement of the tail piece 33 relative to the fish F.

The means 12 is such that the tool may be remotely controlled and operated, that is, so that it may be actuated and released by simple manipulation of the operating string S. A bull nose or guide 43 is provided on the lower end of the stem portion 16 of the body. The guide 43 is provided with a fluid passage 44 for discharging downwardly at the lower end of the tool. The lower end of the guide part 43 is rounded to effectively guide the tool into the fish. Two spiral or helicoidal faces 45 are provided on the upper end of the guide 43. The faces 45 each extend about 180° and terminate in and are joined by vertical shoulders 46. The shoulders 46 are diametrically opposite relative to the vertical center of the tool. The inclined faces 45 preferably occupy substantially the entire upper end of the guide 43. A stop and bearing projection 47 is provided on each face 45 at the upper end of a shoulder 46. The lower end of the tail piece 33 is provided with two spiralled or helicoidal faces 48 opposing and parallel to the faces 45. The spiralled faces 48 terminate in and are joined by diametrically opposite vertical shoulders 49. A stop and bearing projection 50 is provided on each face 48 at the lower end of a shoulder 49. The projections 47 are adapted to slidably engage or ride on the faces 48 while the projections 50 are adapted to slidably engage the faces 45. In this manner the guide 43 has four point engagement with the lower end of the tail piece 33.

The projections 47 and 50 are adapted to cooperate to limit rotative or turning movement in one direction between the body 10 and the tail piece 33. The shoulders 46 and 49 are adapted to cooperate to limit turning movement between the body and tail piece in the other direction. Flattened surfaces 60 at the "high" or "upper" end of each of the spiralled faces 45 and 48 provide resting points for the stop projections 47 and 50 to prevent the unintentional operation of the means 12 due to endwise thrusts when moving the tool longitudinally through the well and fish F. When the tool is in the actuated condition, that is, when the slips are in their innermost positions, the projections 47 and 50 are in cooperation and engage the "flat" portions of the faces 45 and 48 as illustrated in Fig. 3 of the drawing. When the shoulders 46 and 49 are in engagement the tool is fully actuated and the slips 11 are in gripping engagement with the interior of the fish F.

In operation the tool may be lowered into the well with the parts in the positions illustrated in Figs. 2 and 3 of the drawing. The guide 43 is operable to guide the lower end of the tool into the tubular fish. When it is desired to actuate the tool to grip the fish the operating string S is turned backward or in the left hand direction to turn the body 10 in a counter-clockwise direction relative to the tail piece 33. The tail piece 33 remains stationary with the fish and is held against turning movement by the springs 40 which bear outwardly against the interior of the fish. Turning movement of the body 10 in a counter-clockwise or left hand direction relative to the tail piece 33 moves the projections 47 to positions where they are adjacent the bases of the shoulders 49 and opposite the "low" portions of the faces 48. The body 10 may then be raised or moved upwardly relative to the tail piece 33 to cause actuation of the slips 11. It will be apparent how upward movement of the body 10 causes outward actuation of the slips 11. It is to be understood that an up-pull may be maintained on the body 10 when it is turned to actuate the tool so that the projections 47 and 50 slidably engage the faces 45 and 48. In this manner the slips 11 may be actuated by even and uniform upward movement of the body. The springs 38 connect the lower ends of the slips with the tail piece so that the slips are held against upward movement during upward shifting of the body. The inclined faces 19 cooperate with the faces 22 to force the slips 11 outwardly into gripping engagement with the interior of the fish F during upward movement of the body 10. The shoulders 46 and 49 are adapted to cooperate to limit turning of the body in a counter-clockwise direction relative to the tail piece 33. The projections 47 and 50 are adapted to engage the faces 48 and 45 at the bases of the vertical shoulders 46 and 49 to positively limit upward movement of the body 10 relative to the tail piece 33. The tool may be disengaged from the fish F by turning the body 10 in a clockwise or right hand direction. The body 10 may be lowered during its turning in a clockwise direction to allow retraction of the slips 11 or the cooperation of the projections 47 and 50 with the inclined faces may result in downward movement of the body 10 relative to the tail piece 33 to provide for the retraction of the slips. The springs 38 operate to aid in retracting the slips 11 during downward movement of the body 10 relative to the tail piece.

It is to be noted that the invention provides a spear in which the parts are of simple and sturdy construction and are positive in their operation. The tool does not include any delicate parts or parts that are liable to become displaced. The control means 12 is such that the tool may be actuated or released at any time and does not involve latches, screw-threaded parts, or the like, liable to failure.

Having described only a typical preferred form of our invention, we do not wish to limit ourselves to the specific details set forth, but wish to reserve to ourselves any changes or variations that may appear to those skilled in the art or fall within the scope of the following claims.

Having described our invention, we claim:

1. A well tool of the character described including, a body, a tail piece movable relative to the body through engagement with a fish, slips connected with the tail piece and operable outwardly to engage the fish upon such movement of the tail piece, and means for controlling relative movement between the body and tail piece, said means including two helicoidal faces on the tail piece pitched in the same direction and joined by shoulders, a part in connection with the body having two helicoidal faces opposing and parallel to the faces on the tail piece and joined by shoulders, and a projection on each face adjacent a shoulder adapted to cooperate with an opposing face.

2. A well tool of the character described including, a body, a tail piece movable relative to the body through cooperation with a fish, slips connected with the tail piece and operable to engage the fish upon relative movement between the body and tail piece, and means for controlling relative movement between the body and tail piece, said means including two helicoidal faces on the tail piece pitched in the same direction and joined by shoulders, a part on the body having two helicoidal faces opposing and parallel to the faces on the tail piece and joined by shoulders, and a projection on each face adjacent a shoulder adapted to cooperate with an opposing face and the projection on the opposing face.

3. A well tool of the character described including, a body, a tail piece having means for resisting movement in a fish, the body and tail piece being relatively movable, slips connected with the tail piece and operable outwardly to engage the fish upon relative movement between the body and tail piece, and means for controlling relative movement between the body and tail piece, said means including two helicoidal faces on the tail piece pitched in the said direction and joined by shoulders, a part on the body having two helicoidal faces opposing and parallel to the faces on the tail piece and joined by shoulders, and a projection on each face adjacent a shoulder adapted to cooperate with an opposing face and the projection on the opposing face, the projections being adapted to cooperate to limit movement between the body and tail piece.

4. A well tool of the character described including, a body, a tail piece having means for resisting movement in a fish, the body and tail piece being relatively movable, wedge parts on the body, a slip operable outwardly to grip the interior of the fish through cooperation with the wedge parts, and means for connecting the slip with the tail piece including a spring on the slip engaging a shoulder on the tail piece.

5. A well tool of the character described including, a body, a tail piece having means for resisting movement in a fish, the body and tail piece being relatively movable, there being an annular recess in an end of the tail piece, wedge parts on the body, a gripping member operable outwardly through cooperation with the wedge parts and having an end extending into the recess and means connecting the gripping members with the tail piece including a yielding part on the gripping member engaging a shoulder at the recess.

6. A well tool of the character described including, a body, a tail piece having means for resisting movement in a fish, the body and tail piece being relatively movable, there being an annular recess in an end of the tail piece having an internal shoulder adjacent its mouth, wedge parts on the body, gripping members operable outwardly through cooperation with the wedge parts and having end parts extending into the recess, and means connecting the gripping members to the tail piece and urging them inward into cooperation with the wedge parts including springs on said end parts of the gripping members engaging under said shoulder.

7. A well tool of the character described including, a body, a tail piece having means for resisting movement in a fish, the body and tail piece being relatively movable, wedge parts on the body, a gripping member operable through cooperation with the wedge parts and means connecting the gripping member to the tail piece and urging the gripping member inward against the wedge parts.

8. A well tool of the character described including, a body, a tail piece having means for resisting movement in a fish, the body and tail piece being relatively movable, a wedge part on the body, a gripping member operable through cooperation with the wedge part upon relative movement between the body and tail, there being a recess in the body receiving the upper end of the gripping member and a recess in the tail piece receiving the lower end of the gripping member, and means in the last mentioned recess yieldingly holding the gripping member in cooperation with the wedge part.

9. A well tool of the character described including, a body, a tail piece having means for resisting movement in a fish, the body and tail piece being relatively movable, a wedge part on the body, a gripping member operable through cooperation with the wedge part upon relative movement between the body and tail, there being a recess in the body receiving the upper end of the gripping member and a recess in the tail piece receiving the lower end of the gripping member, the gripping member being movable radially in the recesses, and means in the last mentioned recess yieldingly holding the gripping member in cooperation with the wedge part.

10. A spear including an elongate body adapted to be passed into a tubular fish, a tail piece, the body and tail piece being relatively movable, spaced longitudinal series of inclined faces on the body, there being grooves in the body extending longitudinally through the series of inclined faces, gripping members, longitudinal series of inclined parts on the inner sides of the members adapted to cooperate with the inclined faces to cause the members to grip the interior of the fish, keys on the gripping members cooperating with said grooves, the keys extending longitudinally of the series of inclined parts, the inner sides of the keys being substantially parallel with the longitudinal axis of the body whereby the keys form reinforcing bridges connecting the several inclined parts of each series, means connecting the gripping members to the tail piece, and means controlling movement between the body and tail piece.

11. A spear including, a body adapted to be passed into a tubular fish, a tail piece, the body and tail piece being relatively movable, spaced longitudinal series of inclined faces on the body, gripping members, series of inclined parts on each member, the parts being operable through cooperation with the inclined faces to cause the members to grip the interior of the fish, means connecting the gripping members to the tail piece, and means controlling movement between the body and tail piece including a guide part on the body, and cooperating parts on the tail piece and guide part.

12. In a well tool, an elongate body, a series of inclined faces on the body, there being a groove in the body extending longitudinally through said series of inclined faces, a gripping member having a series of projecting parts on its inner side with inclined faces to cooperate with the faces on the body, the body and gripping member being relatively movable, and a key on the inner side of the gripping member connecting said parts and cooperating with said groove, the inner side of the key being substantially parallel with the longitudinal axis of the body.

13. In a well tool, a body, a series of inclined faces on the body, there being a groove in the body extending longitudinally through said series of inclined faces, a gripping member having a series of inclined faces on its inner side to cooperate with the faces on the body, the body and gripping member being relatively movable, and a key on the inner side of the gripping member extending longitudinally of its series of inclined faces and cooperating with the groove to guide the gripping member, the key extending between and connecting the innermost parts of the inclined faces of the member.

14. In a well tool, a body, a series of inclined faces on the body, there being a groove in the body extending longitudinally through said series of inclined faces, a gripping member having a series of inclined faces on its inner side to cooperate with the faces on the body, the body and gripping member being relatively movable, and a longitudinal key on the gripping member joining the several inclined faces on the inner side of the gripping member to bridge the spaces between them, the key being slidable in said groove.

15. A fishing tool including, a body adapted to be passed into a tubular fish, a tail piece, the body and tail piece being relatively movable, a longitudinally extending series of inclined faces on the body, there being a longitudinal groove in the body extending through the series of inclined faces, a gripping member, a series of projecting parts on the gripping member having inclined faces operable through cooperation with the inclined faces on the body to cause the gripping member to move outwardly into engagement with the fish, a key on the gripping member connecting said parts and cooperating with the groove, means connecting the member with the tail piece, and means for controlling movement between the body and tail piece.

OTIS J. McCULLOUGH.
IRA J. McCULLOUGH.